United States Patent [19]

Rawlings et al.

[11] Patent Number: 4,765,061
[45] Date of Patent: Aug. 23, 1988

[54] CADDY FOR LEVEL VIAL

[76] Inventors: Eugene Rawlings, 343 Shore Dr., Ft. Myers, Fla. 33905; John D. Coleman, 4650 Sheldon St., Philadelphia, Pa. 19127

[21] Appl. No.: 85,706

[22] Filed: Aug. 17, 1987

[51] Int. Cl.⁴ .............................................. G01C 9/24
[52] U.S. Cl. .................................................... 33/379
[58] Field of Search .................. 33/370, 379, 376, 347

[56] References Cited

U.S. PATENT DOCUMENTS 3,738,015 6/1973 DeJong ................................. 33/379

FOREIGN PATENT DOCUMENTS 3215667 10/1983 Fed. Rep. of Germany ........ 33/379

Primary Examiner—Harry N. Haroian
Attorney, Agent, or Firm—Frederick J. Olsson

[57] ABSTRACT

For a level having a platform with an opening, a caddy supporting a level vial so that the vial can be replaced. The caddy includes a keeper body and a latch body which mutually support the vial and which are positioned respectively on opposite sides of the opening. Latch and keeper means hold the bodies in tight engagement with the platform and can be released to allow the bodies to be separated for vial replacement.

2 Claims, 1 Drawing Sheet

U.S. Patent  Aug. 23, 1988  4,765,061
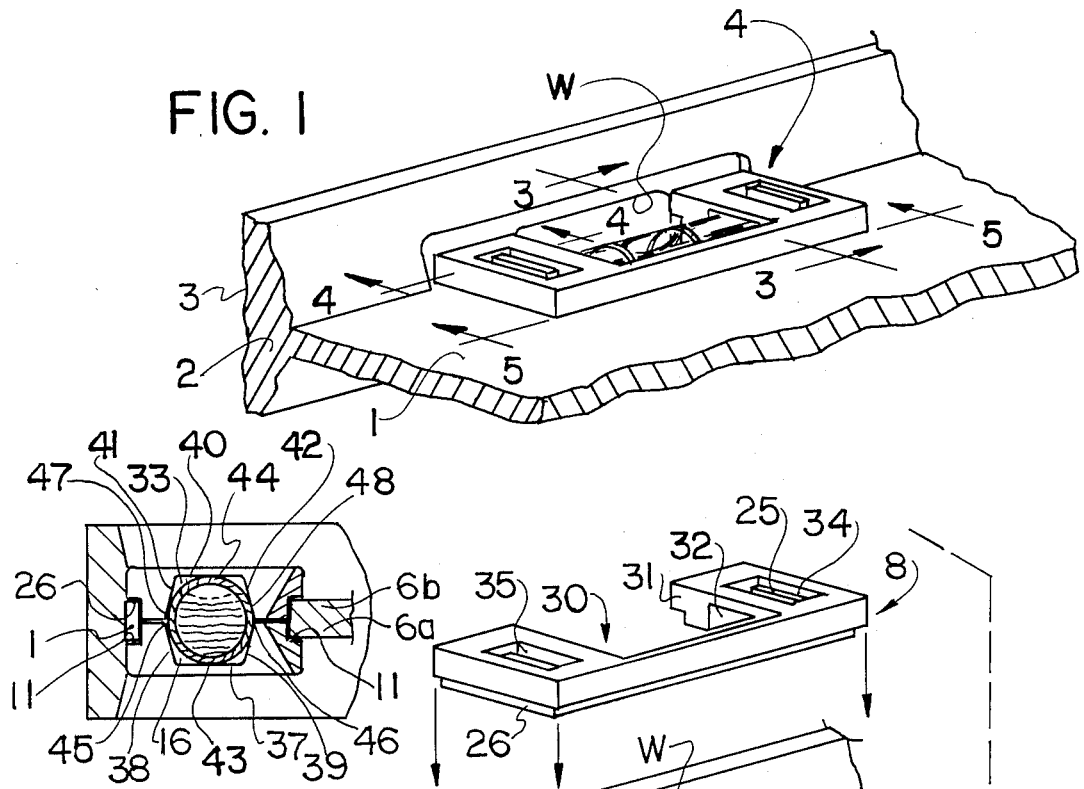
FIG. 1
FIG. 3
FIG. 2
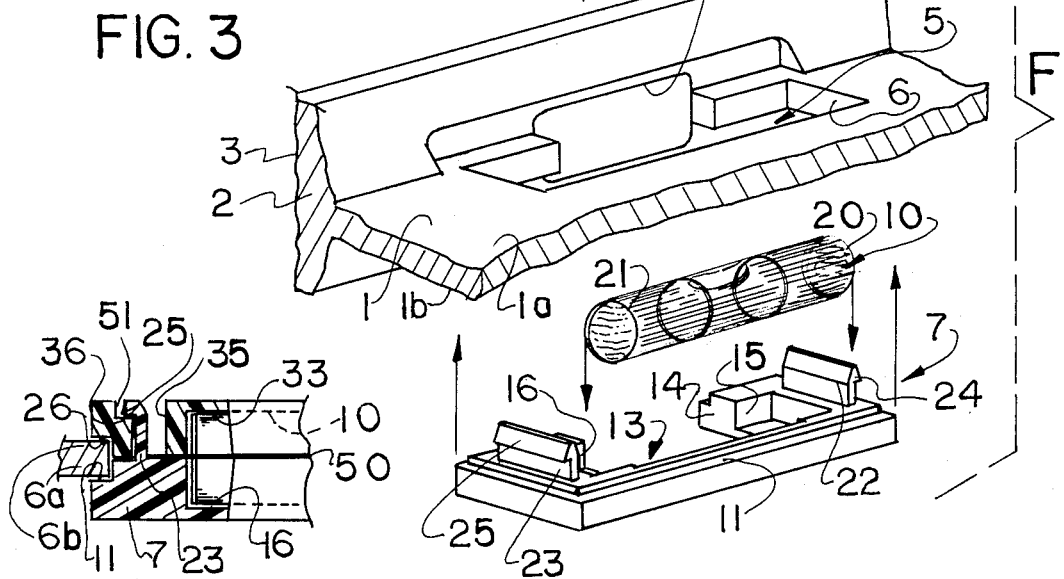
FIG. 4
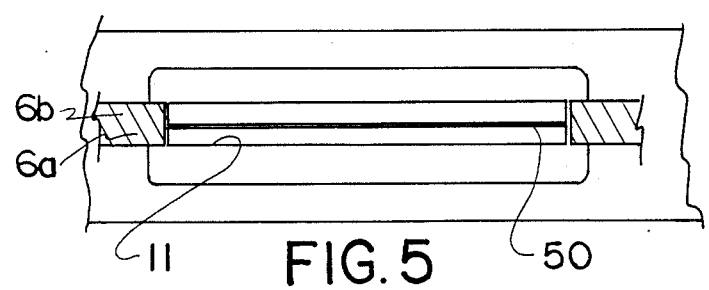
FIG. 5

CADDY FOR LEVEL VIAL

This invention relates to portable hand levels for tradesmen and do-it-yourselfers and in particular relates to a caddy which supports a level vial in a manner so that if the vial is damaged or obscured, the same can be quickly replaced.

The conventional level has two bubble vials, one for horizontal applications and the other for vertical applications. While in most levels the bubble vials have a protective means, the same must include a window so that the bubble can be viewed. Thus, bubble level vials can be contacted by various objects which may cause breakage and also such vials are subject to be covered with paint or concrete and the like and the bubble obscured. In both instances the utility of the vial is destroyed or greatly impaired. As a consequence, the level has to be replaced.

The present invention provides a caddy which mounts the bubble vial in a manner to permit a broken or visually impaired vial to be quickly removed and replaced by a new vial and to accomplish this without any sacrifice of the requirement for precise alignment of the vial with the level operating surfaces which are engaged with the surface of the object to be tested. Thus, the necessity of replacing the level is eliminated.

The principal object of the invention is to promote the useful arts of portable hand levels by providing caddy means which permits a damaged vial to be replaced while maintaining accuracy.

The invention will be described below in connection with the following drawings wherein:

FIG. 1 is a perspective view of the caddy as incorporated in an opening in the level shown in U.S. Pat. No. 4,144,650;

FIG. 2 is a perspective, exploded view of the caddy of FIG. 1;

FIG. 3 is an enlarged cross sectional elevational view taken along the lines 3—3 of FIG. 1;

FIG. 4 is an enlarged cross sectional elevational view taken along the lines 4—4 of FIG. 1; and FIG. 5 is an enlarged elevational view taken along the lines 5—5 of FIG. 1.

The caddy will be described in connection with its mounting in the level of U.S. Pat. No. 4,144,650.

The level of U.S. Pat. No. 4,144,560 has a bubble vial set up for horizontal applications and a bubble vial set up for vertical applications. As shown herein, the caddy is used to support the bubble vial for use in horizontal applications. However, it will be understood that the caddy can be employed in a position on the level for vertical applications. Also, it will be readily apparent as the description proceeds that the caddy has utility with types of levels other than that shown in U.S. Pat. No. 4,144,560.

In FIG. 1, the numeral 1 indicates the web or platform of the level, the numeral 2 indicates upper and lower flanges of the level. The numeral 3 indicates the outside operating surface formed by the flanges.

The caddy 4 is disposed in an opening 5 (FIG. 2) in the platform 1. The opening is formed as by the inside edge 6. The platform 1 and the flanges 2 are cut away to provide a window W through which the bubble vial of the level can be viewed.

Referring to FIG. 1 the caddy includes the latch body 7 and the keeper body 8. The bubble vial supported by the caddy is indicated at 10. The vial is of conventional form. The bodies 7 and 8 are plastic injection molded preferably employing ABS type plastic made by Borg-Warner Corp.

As will be evident, the latch body 7 and the keeper body 8 are positioned in the opening 5 on opposite sides of the platform 1. The latch and keeper bodies engage with opposite sides of the platform 1 by overlaping the areas adjacent the edge 6 of the opening 5 and tightly engage these areas to hold the caddy in secure but releasable condition.

The latch body 7 is elongated in an amount commensurate with the length of the bubble vial 10 and has an upwardly facing peripheral shoulder 11, whose function is to receive the lower portion 6a of the edge 6 of the opening 5 as will be seen in FIGS. 3, 4, and 5. A central opening 13 in the latch body 7 includes the side opening 14. A pair of sockets 15 and 16 are formed in the body 7 respectively at opposite ends of the central opening 13. The sockets 15 and 16 respectively receive and support the lower portions of the ends 20 and 21 of the vial 10.

A pair of fingers 22 and 23 are respectively adjacent to the sockets 15 and 16. The fingers have outwardly facing shoulders 24 and 25. Each shoulder constitutes a latch means to receive a keeper as will presently appear. The fingers can flex in a direction along the axis of the vial 10.

The keeper body 8 is also elongated commensurate with the length of the bubble vial 10 and has a downwardly facing peripheral shoulder 26 whose function is to reveive the upper portion 6b of the edge 6 of the opening 5 as will be seen in FIGS. 3, 4, and 5. A central opening 30 in the keeper body 8 includes the side opening 31.

A pair of sockets 32 and 33 are formed in the body respectively at opposite ends of the central opening 30. The sockets respectively receive and support the upper portions of the ends 20 and 21 of the vial 10.

A pair of cavities 34 and 35, which extend clear through the body 8, are formed respectively adjacent the sockets 32 and 33. The cavities 34 and 35 each have an inwardly facing shoulder such as the shoulder 36 for cavity 35 shown in FIG. 4. Each shoulder constitutes a keeper means. Specifically, the shoulder 36 is the keeper for the latch 25 (FIG. 4) and the shoulder (not shown) in cavity 34 is the keeper for the latch 24.

The manner of assembling the caddy will now be commented on.

First the vial 10 is placed in the sockets 15 and 16 in the latch body 7. Next, the body 7 with the vial is pushed up through and into opening 5 until the peripheral shoulder 11 engages the lower edge 6a. The body 7 is held in that position.

Now, the keeper body 8 is moved down and into the opening 5 with the cavities 34 and 35 receiving the fingers 22 and 23. The fingers are engaged and flexed inwardly and with continual motion the latches 24 and 25 snap over the keepers. The sockets 32 and 33 engage the respective ends 20 and 21 of the vial and the peripheral shoulder 26 engages the upper edge 6b. The keeper body is now secured in position.

It will be apparent that as the caddy is mounted in the level, the vial can be seen through the window W and from either side of the web or platform 1.

There are several important dimensions and surface alignments which are incorporated into the caddy and these will now be discussed.

First, it will be evident that the opposite surfaces 1a and 1b of the platform or web 1 must be parallel and normal to the outside surface 3 of the flange 2. Also, it will be evident that (FIG. 2) the long portions of the edge 6 of the opening 5 must be parallel to the outside operating surface 3 and normal to the opposite sides 1a and 1b.

Thus, the peripheral shoulder 11 of the latch body 7 is dimensioned to engage the inside edge 6 of the opening 5 with a snug, sliding fit to provide for the latch body 7 to be tight in the opening 5. Likewise, the shoulder 26 of the keeper body 8 is dimensioned to engage the inside edge 6 of the opening 5 with a snug, sliding fit so that the body 8 is tight in the opening 5.

The surfaces forming the sockets 15, 16, 32, and 33 are accurately oriented with respect to the peripheral shoulders 11 and 26 (hence to the outside operating surface 3) so as to support the bubble vial in parallel relationship to the outer operating surface 3. The structure of the cavities and the manner in which the surfaces of the cavities support the ends of the bubble vial will be commented on in connection with FIG. 3 for the sockets 16 and 33.

The latch body 7, the socket 16 has a bottom wall 36 and a pair of side walls 37 and 38 extending away from the bottom wall, each at the same obtuse angle. In keeper body 8, the socket 33 has a bottom wall 40 and a pair of side walls 41 and 42 extending away from the bottom wall 40 each at the same obtuse angle which are the same as the corresponding obtuse angles for the side walls 37 and 38 of socket 16.

The diameter of the end 31 of the vial and the orientations of the socket 16 side walls 37 and 38 and socket 33 side walls 41 and 42 are related so that the end 21 of the vial (a) makes contact with the bottom walls 36 and 40 at the contact points indicated at 43 and 44; and (b) makes contact with the side walls at contact points indicated at 44/45 and 46/47. The contact points 44, 45, 46, and 47 are closely adjacent the outer edges of the respective side walls.

The dimensions of the latch 25 and keeper 36, and the corresponding latch 24 and its keeper (not shown) develop pressure to keep the vial 10 secured in the sockets and hold the latch and keeper bodies firm against the platform 1. This is explained following.

When the latches 24 and 25 snap into place on the respective keepers, the latch and keeper bodies are urged together so that there is bearing pressure developed at the respective contact points 43-48 and bearing pressure developed at the engagement of the shoulders 11 and 26 with the opposite sides 1a and 1b of the platform 1 around the opening 5.

With reference to FIGS. 3, 4, and 5, it will be seen that there is a space 50 between the latch and keeper bodies 7 and 8. This space is for the purpose of permitting that development of the above mentioned pressures at the contact and engagement points.

It is to be noted that motion of the caddy 4 in a direction along the axis of the vial 10 is restrained by the snug, sliding engagements of the short dimension of the edge 6 with the shoulders 11 and 26. Likewise, axial motion of the vial 10 is restrained by the engagements of the ends of the vial with the ends of the respective sockets.

With the caddy secured in position as above described, the same can be easily released for vial replacement. This is done simply by moving the latches 24 and 25 out of engagement with the respective keepers. The blade of a screw driver is inserted in the space between the latch and the keeper body and the blade is twisted to move the latch out of position. For example, with a blade inserted in the space 51 (FIG. 4) the blade is twisted to release the latch 25. The operation is repeated for the latch 24. The bodies 7 and 8 now can be separated.

We claim:

1. The combination of a level, a level vial, and a caddy for supporting the level vial on the level:

said level having a flat platform and a platform opening therein;

said caddy having an elongated keeper body comprising:
   (a) a keeper body mounting shoulder extending at least partially around the edge of said platform opening and engaging one side of said platform;
   (b) a keeper central opening;
   (c) a pair of keeper sockets respectively formed adjacent opposite ends of said keeper central opening; and
   (d) a pair of keeper cavities formed respectively adjacent to and outboard of said keeper sockets and extending through the keeper body and each keeper cavity having an inwardly facing keeper shoulder;

said caddy also having an elongated latch body comprising:
   (e) a latch body mounting shoulder extending at least partially around the edge of said platform opening and engaging the opposite side of said platform;
   (f) a latch central opening aligned with said keeper central opening;
   (g) a pair of latch sockets respectively formed adjacent opposite ends of said latch central opening and aligned with said keeper sockets;
   (h) a pair of flexible fingers formed respectively adjacent to and outboard of said latch sockets and respectively extending through said keeper cavities and each finger having an outwardly facing latch shoulder, the latch shoulders respectively engaging said keeper shoulders;

said level vial extending across said keeper and latch central openings with the opposite ends of the level vial being respectively disposed in and engaged with said keeper and latch sockets, the level vial being viewable through the keeper central opening and the latch central opening;

the dimensions of said keeper body and said latch body providing for the bodies to be spaced apart with said keeper body mounting shoulder and said latch body mounting shoulder engaged with said platform and the opposite ends of said level vial engaged with said keeper and latch sockets; and the respective cross-sectional areas of said keepers cavities providing space for the flexible fingers to enter the cavities and engage said keeper shoulders and for the fingers to be manually moved out of said engagement for purposes of removing the bodies from the level.

2. A caddy for supporting a level vial on a level:

said caddy having an elongated keeper body comprising:
   (a) a keeper body mounting shoulder extending at least partially around the periphery thereof;
   (b) a keeper central opening;

(c) a pair of keeper sockets respectively formed adjacent opposite ends of said keeper central opening; and (d) a pair of keeper cavities formed respectively adjacent to and outboard of said keeper sockets and extending through the keeper body and each keeper cavity having an inwardly facing keeper shoulder;

said caddy also having an elongated latch body comprising:

(e) a latch body mounting shoulder extending at least partially around the periphery thereof;

(f) a latch central opening aligned with said keeper central opening;

(g) a pair of latch sockets respectively formed adjacent opposite ends of said latch central opening and aligned with said keeper sockets;

(h) a pair of flexible fingers formed respectively adjacent to and outboard of said latch sockets and respectively extending through said keeper cavities and each finger having an outwardly facing latch shoulder, the latch shoulders respectively engaging said keeper shoulders;

said level vial extending across said keeper and latch central openings with the opposite ends of the level vial being respectively disposed in and engaged with said keeper and latch sockets, the level vial being viewable through the keeper central opening and the latch central opening;

the dimensions of said keeper body and said latch body providing for the bodies to be spaced apart when the opposite ends of said level vial are engaged with said keeper and latch sockets; and the respective cross-sectional areas of said keeper cavities providing space for the flexible fingers to enter the cavities and engage said keeper shoulders and for the fingers to be manually moved out of said engagement for purposes of removing the bodies from the level.

* * * * *